United States Patent Office 3,480,667
Patented Nov. 25, 1969

3,480,667
METHOD OF PRODUCING FLUORINATED COMPOUNDS

William R. Siegart, Poughkeepsie, William D. Blackley, Wappingers Falls, Harry Chafetz, Poughkeepsie, and Matthew A. McMahon, Jr., Hopewell Junction, N.Y., assignors to Texaco Inc., New York, N.Y., a corporation of Delaware No Drawing. Filed Apr. 28, 1965, Ser. No. 451,632
Int. Cl. C07b *9/00;* C08f *27/03;* C07c *17/00*
U.S. Cl. 260—514 21 Claims

ABSTRACT OF THE DISCLOSURE

A method of fluorinating an organic compound comprising contacting said compound with fluorine in the presence of an alkali metal fluoride catalyst.

This invention relates to a method of preparing organic fluorine containing compounds. More particularly, it pertains to the production of fluorocarbons, substituted fluorocarbons and polymers thereof under relatively mild fluorination conditions in the presence of an alkali metal fluoride catalyst.

The fluoro compounds produced by the method of the invention are useful as water-proofing agents, e.g., for fiber board and cloth surfaces. Further, they are useful as lubricants.

In the past, one of the problems in the fluorination of organic compounds with gaseous fluorine was that the initial fluorination had to be conducted at such relatively high temperatures so as to initiate the reaction that the reaction once initiated was so energetic that extreme pyrolysis of the organic material often took place with the resultant formation of carbon and tars. Further, prior to our invention, the art found it difficult to fluorinate with gaseous fluorine, organic compounds containing substituent groups such as carboxyl and nitro groups and retain the substituent groups in the compounds during fluorination. These groups often disappeared during said fluorination.

In an attempt to conduct lower temperature fluorination with gaseous fluorine and thereby prevent the decomposition of the material to be fluorinated, the prior art employed polyvalent metal halide catalysts such as cuprous chloride, silver chloride, ferric bromide, antimony trifluoride, silver fluoride and cobaltic chloride to produce fluorinated compounds at reduced temperatures. Although the prior art polyvalent metal halides permitted the production of fluoro compounds without the formation of carbon, tar and other undesirable carbonaceous decomposition products in some instances, this was not the universal case with many hydrocarbon reactants since the polyvalent metal halide catalyst still requires a high enough initial reaction temperature, e.g., 200–300° C. to be effective to render the fluorination difficult to control once it begins. In addition, the polyvalent metal catalyst must be frequently regenerated. Further, they are relatively costly and permit the evolution of undesirable hydrogen fluoride by-product during fluorination. Still further, the prior art polyvalent metal halide catalysts did not prevent the decomposition of substituent groups in the compounds during fluorination. Still further, although the polyvalent metal halides are termed in the art as catalysts they are not true catalysts but function as a fluorinating agent due to their polyvalent nature.

In contrast, we have discovered and this constitutes our invention, a novel method of bulk fluorinating wide variety of hydrocarbons, substituted hydrocarbons and polymers with gaseous fluorine in the presence of a true catalyst under sufficiently mild conditions to produce without charring fluorinated monomers, relatively low molecular weight solvent soluble fluorinated polymers and substituted fluorinated polymers where hydrocarbon and substituted hydrocarbon monomers are the reactants. Further, our method is suitable for fluorinating high molecular weight polymers, e.g., polyalkylene compounds of 10,000 to 200,000 M.W. having a melt index between about 0.2 and 200 without evidence of charring or the formation of undesirable tar or tar-like products. Still further, the catalyst employed in the method of our invention is of relatively low cost, does not require frequent regeneration and suppresses the evolution of undesirable hydrogen fluoride in the exit reactor gases.

More particularly, the method of our invention comprises contacting organic materials with gaseous fluorine in the presence of alkali metal fluoride catalysts. Advantagously, the catalytic fluorination is conducted at temperatures between about −100° C. and 200° C. Further, the alkali metal fluoride catalyst is normally present in an amount of between about 0.1 and 100 or higher moles per mole of organic material reactant. Under preferred conditions the amount of alkali metal fluoride employed desirably is in excess (mole basis) in respect to the hydrogen fluoride by-product of the reaction. To facilitate contact of the fluorine and organic material with the fluoride catalyst, the catalyst is advantageously utilized in the finely divided state, e.g., of an average diameter of less than about 1 mm., preferably of a particle size able to pass a screen of between 20 and 325 mesh (U.S.). In order to maintain a more controlled fluorination reaction, the fluorine reactant may be diluted with inert gas such as nitrogen, helium, argon, xenon and neon, advantageously in a volume ratio of between about 0.5:1 and 100 :1 inert gas to $F_2$. The fluorination is conducted for a period of time dependent on the degree of fluorination desired. For example, to form perfluorododecane from dodecane at least 26 moles of fluorine are needed per mole of dodecane while only 13 moles of fluorine are nedded per mole of dodecane to form $C_{12}H_{13}F_{13}$.

Examples of the organic materials contemplated in the fluorination precdure of the method of the invention are the aromatic hydrocarbons (e.g. $C_6$–$C_{20}$) such as benzene, butylbenzene, xylene, toluene, naphthalene, the aliphatic and cycloaliphatic hydrocarbons such as hexane, dodecane, cyclohexane, paraffin wax, polyethylene, polypropylene, aromatic hydrocarbon polymers such as polybenzene (500–50,000 M.W.), substituted aromatic hydrocarbons such as benzoic acid and nitrobenzene and aliphatic substituted hydrocarbons, e.g., dibasic acids ($C_3$–$C_{20}$), malonic, succinic, adipic and sebacic acid. Further examples of substituted reactants contemplated herein are the nonfluoro halide substituted hydrocarbons such as hexachlorobenzene.

Examples of the alkali metal fluoride catalyst contemplated herein are sodium fluoride, potassium fluoride, lithium fluoride, cesium fluoride and rubidium fluoride.

In the method of operation of the invention the catalyst is advantageously dispersed in a finely divided state throughout the organic material to be fluorinated (also in a finely divided state if solid). The most desirable physical relationship between organic reactant and catalyst is where the organic reactant is essentially a coating, e.g., less than about 1 mm. thickness on the catalyst surface. This latter relationship unexpectedly permits under a given set of conditions the introduction of a substantially larger quantity of fluorine in a given organic material than when the organic material and catalyst are separate particles in the reactant mixture. The coating relationship is accomplished by mixing the catalyst and a solvent solution of said organic material, removing the solvent and particlizing the resultant solid mass to a finely divided state, if not already in the finely divided state, to facilitate its contact with the gaseous fluorinating agent. The coating of the catalyst with organic reactant material can also be accomplished by introducing the catalyst in said material maintained in the molten state and solidifying by cooling the resultant mixture, preferably under agitation conditions to facilitate particlization. By the term "finely divided" a particle size of an average diameter of less than about 1 mm., preferably a particle size between about 20 and 325 mesh, is intended.

Although some fluorination of all the products will take place in the reaction temperature range prescribed, the preferred temperatures are dependent upon the particular organic compound to be fluorinated. For example, aromatic hydrocarbons are preferably fluorinated at between about −20 and 100° C. Specifically, benzene is preferably fluorinated at a temperature between about −20 and 200° C., toluene between about −20 and 100° C. and naphthalene between about 10 and 100° C. The substituted carboxylic aromatic and aliphatic compounds are preferably fluorinated at between about −20 and 50° C. and the alkane and polyalkylene compounds are desirably fluorinated between about 10 and 200° C. Further, the reaction temperature initially employed is preferably on the low end of the effective temperature range being increased only when fluorine is no longer absorbed by the organic reactant and an increase in degree of fluorination is desired and feasible.

The following examples further illustrate the invention but are not to be construed as limitations thereof. Further, all the reactant and catalyst materials utilized in the following example methods, if solid under the reaction conditions, were in the finely divided state, i.e., of an average particle diameter of less than 1 mm. Broadly the apparatuses employed in the following examples were vertical reactors of cylindrical shape fitted at the lower end with a gas inlet tube and at the upper end with a gas exit tube. The reactors were normally surrounded by a temperature control means (e.g. heating coil, bath) and in some instances were fitted internally with a stirrer. They were of a copper, stainless steel, or glass construction.

Example I

This example illustrates the fluorination of aromatic hydrocarbons to form telomers made up of units of fluorinated cycloalkane radicals.

In the general procedure of the example an aromatic hydrocarbon was intimately mixed with sodium fluoride and the mixture is placed in the reactor. The reactor was adjusted to the desired temperature or in some instances the reaction was started at room temperature either allowed to proceed at its own temperature or the temperature is controlled. The reactor system was then thoroughly flushed with nitrogen at a rate of 100–300 cc./minute. Then fluorine is added to the nitrogen stream at a rate of 10 to 30 cc./minute. The resultant gaseous fluorinating mixture was passed through the reactor intimately contacting the organic reactant. The fluorinating gas rate was regulated to maintain the desired reaction temperature and to prevent combustion of the hydrocarbons. The fluorine flow was stopped when the reactant ceased to absorb fluorine as indicated by periodically monitoring the gas flow at the gas exit of the reactor with potassium iodide-starch paper. At the end of the reaction the system was again flushed with nitrogen. The solid products in the reactor were removed from the sodium fluoride by solvent usually via ether extraction and were characterized by infrared, nuclear magnetic resonance, mass spectroscopy, molecular weight and elemental analyses. A more detailed description of reaction conditions and resultant products are reported below in Tables IA and IB:

TABLE IA.—FLUORINATION OF AROMATIC HYDROCARBON

[Reaction Conditions]

| Run No. | Hydrocarbon grams | NaF, g. | Diluent, cc./min. | React Time, min. | React Temp., ° C. |
|---|---|---|---|---|---|
| Run A | Benzene (1.8) | 12 | $F_2$ 18, $N_2$ 140 | 14 | −20 |
| Run B | Benzene (3.0) | 20 | $F_2$ 7–10, $N_2$ 83 | 215 | −20 |
| Run C | Benzene (5) | 25 | $F_2$ 20, $N_2$ 150 | 360 | −20 |
| Run D | Benzene (2) | 75 | $F_2$ 10–15, He 175 | 60 | −20 |
| Run E | Toluene (4) | 20 | $F_2$ 8, $N_2$ 80 | 360 | −5–−10 |
| Run F | Naphthalene (21) | 12 | $F_2$ 15, $N_2$ 155 | 315 | 23 |
| Run G | Benzene (0.5) | 0 | $F_2$ 10, $N_2$ 260 | 100 | −12 |
| Run H | Benzene (2) | 0 | $F_2$ 22, $N_2$ 125 | 155 | −60 |

TABLE IB.—SOLID REACTION PRODUCT

| Run No. | Melting Point, ° C. | Average M.W. | Elemental Analysis |
|---|---|---|---|
| Run A | 90–100 | 670 | |
| Run B | 90–130 | 670±30 | 47.5% F, 37.9% C, 2.2% H. |
| Run C | 100–110 | 896 | 52.8% F, 36.8% C, 2.1% H. |
| Run D | 80–100 | 1,106 | 52.1% F, 47.9% C and H. |
| Run E | 110–115 | 1,000 | 47.6% F, 52.4% C and H. |
| Run F | 78–80 | 1,400 | 54.7% F, 45.3% C and H. |
| Run G | Black Tar | | |
| Run H | No Reaction | | |

The products of Runs A, B, C and D were solid-like substances having broad C═F absorptions between 7 and 9 microns in the infrared spectra and very broad $F^{19}$ and $H^1$ nuclear magnetic resonance (NMR) absorptions indicated the presence of a large number of isomers. Elemental and molecular weight analyses of the solid products of Runs A through D together with the infrared and NMR analyses support the view that it is essentially telomeric in nature of the empirical formula $(C_6F_6H_4)_x$ where $x$ is an average integer ranging from about 3 to about 6 depending on molecular weight. Evidence indicates the individual repeating units of the telomer are hexafluorocyclohexane radicals.

Runs G and H indicate the necessity of utilizing sodium fluoride as catalyst since in Run G a temperature of −12° C. permits the production of black tar while there is no reaction at −60° C.

The structure of the solid products of Runs E and F are similar to that of the solid products of benzene fluorination in that they are telomeric in nature with the individual repeating units indicated to be fluorocyclo-olefinic in nature.

Example II

This example illustrates the method of the invention when a dibasic acid is the organic material to be fluorinated.

The procedure used was essentially that used in the fluorination of the aromatic hydrocarbons described in Example I. The particular charge and reaction conditions are reported below in Table II:

TABLE II

Charge and reaction conditions

| | | |
|---|---|---|
| Malonic acid | grams | 2 |
| Sodium fluoride | do | 20 |
| Fluorine rate | cc./min | 10 |
| Nitrogen rate | cc./min | 150 |
| Reaction temperature | ° C | −20 |
| Reaction time | hour | 1 |

After fluorination extraction of the sodium fluoride catalyst bed with ether and evaporation of the ether extract gave a very hygroscopic solid material residue which could be sublimed at 130° C./1 mm. Hg giving a white solid which became moist immediately upon exposure to the atmosphere and in a few minutes turned completely liquid. Two sublimations followed by a transfer in a dry box gave a white solid which had the following elemental analysis: C=23.5 wt. percent, H=0.98 wt. percent, F=32.4 wt. percent. This material was identified as $CF_2$ $(COOH)_2$ which has a theoretical elemental analysis of C=25 wt. percent, H=1.43 wt. percent and F=27.1 wt. percent.

Example III

This example illustrates the method of invention when benzoic acid is to be fluorinated.

The procedure employed was of the general type utilized in Example I. The charge to the reactor was 15 grams of benzoic acid and 50 grams of sodium fluoride. The gas rate was 110 cc./min. made up of 10 cc./min. of fluorine and 100 cc./min. of nitrogen charged to the reactor at room temperature. The reaction temperature averaged 40° C. Two runs were made and the analysis of the resultant product are reported below in Table III under Runs J and K. The difference between Runs J and K was that in Run J the benzoic acid was physically mixed with sodium fluoride while in Run K benzoic acid was deposited on the sodium fluoride by evaporation from an ether solution with stirring. Further, the reaction time in Run J was 17.2 hours and in Run K it was 17.8 hours.

TABLE III

| | Run No. | | | |
|---|---|---|---|---|
| | J | | K | |
| | (a) | (b) | (c) | (d) |
| Wt. percent C | 29.0 | 30.1 | 45.4 | 36.2 |
| Wt. percent H | 0.6 | 0.7 | 2.66 | 1.75 |
| Wt. percent F | 60.6 | 62.9 | 37.4 | 51.7 |
| Molecular Wt | 2,206 | 1,120 | 330 | 1,485 |
| M. P., ° C | 80–85 | 130–140 | 66–67 | 105–120 |
| Yield, g | 8.0 | 0.8 | 6.5 | 10.3 |

(a) Portion of product soluble in ether and boiling toluene/hexane.
(b) Portion of product soluble in ether, insoluble in boiling toluene/hexane.
(c) Portion of product soluble in benzene.
(d) Portion of product insoluble in benzene, soluble in ether.

The above analysis plus additional infrared and nuclear magnetic resonance analysis which found the absorption was broad and characterized by a mixture of isomers containing both C=F and F=C=F groups indicated that the products were telomeric in nature primarily made of repeating polyfluorocyclohexane carboxylic acid radical units.

Example IV

This example illustrates the fluorination of phthalic anhydride by the method of the invention.

The procedure employed was of the general type of Example I. Two runs were carried out. Run R was carried out in a small unstirred vertical reactor utilizing 15 grams of phthalic anhydride and Run S in a large stirred vertical reactor utilizing 15 grams of phthalic anhydride. The fluorination was initiated at room temperature and was conducted at a 40° C. average using a gaseous mixture of fluorine and nitrogen at a rate of 110 cc./min. made up of 10 cc./min. fluorine and 100 cc./min. of nitrogen. The reaction time for Run No. R was 7.1 hours and 13 hours for Run No. S. Analysis of the resultant fluorinated products is described below in Table IV:

TABLE IV.—ANALYTICAL DATA FOR FLUOROCARBON PRODUCTS FROM PHTHALIC ANHYDRIDE

| | Run No. | |
|---|---|---|
| | R | S |
| Wt. percent F | 31.4 | 35.0 |
| Wt. percent C | 38.5 | 37.3 |
| Wt. percent H | 3.0 | 3.2 |
| Molecular Wt | 745 | 536 |
| Yield, g | 0.8 | 8.65 |
| Empirical Formula | $(C_8H_8O_4F_4)_{3.1}$ | $(C_8H_8O_4F_4)_{2.2}$ |

The infrared spectra show the presence of carboxylic acid, C=H and C=F groups as well as bands characteristic of the cyclohexane compounds. The products are a telomeric mixture of compounds varying in the number of repeating telomeric units and isomers containing C=F and F=C=F groups as evidenced by their infrared and nuclear magnetic resonance spectra.

Sixteen grams of fluorinated phthalic anhydride of the type prepared in Run S were esterified with methyl alcohol in the presence of a sulfonic acid ion exchange catalyst and a methylester was formed and gave the following analysis:

TABLE V.—ANALYSIS FOR METHYL ESTER OF FLUOROCARBON PRODUCT

| | Calcd. For Methyl Ester of Fluorocarbon Product Based on $C_{10}H_{12}O_4F_4$ Telomeric Unit | Found |
|---|---|---|
| Tests: | | |
| Wt. Percent C | 45.8 | 46.3 |
| Wt. Percent H | 4.4 | 3.4 |
| Wt. Percent F | 27.9 | 31.0 |
| Molecular Wt | 272 | 346 |
| B.P., ° C | | 92–96 (1 mm. Hg) |

The formation of the ester indicated the presence of a carboxyl group in the fluorocarbon product of Run S.

Example V

This example illustrates the fluorination of nitrobenzene by the method of the invention.

The procedure was essentially of the general type employed in Example I. Two runs were undertaken, the first run was in an unstirred vertical reactor and the charge was 3 grams nitrobenzene mixed with 10 grams of sodium fluoride. The second run was conducted in a larger stirred reactor with the addition of 7 grams of nitrobenzene and 30 grams of sodium fluoride. The test data and results are reported below in Table VI:

TABLE VI.—FLUORINATION PRODUCTS FROM NITROBENZENE

| | Run No. | | | |
|---|---|---|---|---|
| | U (Unstirred) | | V (Stirred) | |
| | Benzene Soluble | Ether Soluble | Benzene Soluble | Ether Soluble |
| Wt. Percent C | 34.8 | 34.6 | 41.6 | 39.2 |
| Wt. Percent H | 2.6 | 2.5 | 3.2 | 3.1 |
| Wt. Percent F | 31.3 | 36.2 | 37.2 | 29.1 |
| Wt. Percent N | 5.5 | 4.4 | 7.7 | 6.4 |
| Molecular Wt | | | 469 | 743 |
| Yield, g | 1.2 | 1.45 | 0.6 | 0.57 |
| M.P | 125–127° (decompn.) | 130° C. | 77–80 | 90–103° |

The infrared and nuclear magnetic spectra show that the products contained $NO_2$, were cyclohexane derivatives, and were composed of a mixture of isomers containing C=F and F=C=F groups. The above indicate the products were dimer and trimers made up of isomers of the fluorinated nitrocyclohexane analogs of nitrobenzene.

Example VI

This example illustrates the fluorination of high density polyethylene of an average molecular weight of about 110,000 and a melt index of 0.9.

The apparatus employed was essentially of the type described in Example I.

Thirty grams of high density polyethylene were dissolved in 450 cc. of boiling toluene. To the stirred solution there was added 62 grams of lithium fluoride. The stirred suspension was cooled to room temperature thereby precipitating the polyethylene on the fluoride surface, filtered and the solids washed with ether and dried. The solids were then ground in a mill to a particle size diameter of less than 1 mm., washed with ether and dried. The resultant polyethylene coated lithium fluoride particles were charged to a stirred reactor. Fluorine (10 cc./min.) diluted with nitrogen (100 cc./min.) was passed through the stirred bed. The total time of fluorination was 50.9 hours and the reactor temperature was 45° C.

The combined products (147 grams) were charged to an extraction apparatus and extracted with boiling toluene. The boiling toluene soluble fraction of the fluorinated product was analyzed and found to be of the following analysis:

TABLE VII

| | | |
|---|---|---|
| Melting point | ° C | 121–140 |
| Carbon | wt. percent | 72.4 |
| Hydrogen | wt. percent | 10.2 |
| Fluorine | wt. percent | 14.6 |

Infrared spectrum of the toluene soluble portion of the fluorinated carbon found essentially a polyethylene with C═F absorptions.

The toluene insoluble portion was extracted with water and 2 N-hydrochloric acid filtered and washed until the filtrate was neutral. Analysis of the insoluble product found the following:

TABLE VIII

| | | |
|---|---|---|
| Melting point | ° C | >300 |
| Carbon | wt. percent | 39.4 |
| Hydrogen | wt. percent | 3.6 |
| Fluorine | wt. percent | 50.5 |

Infrared spectrum of the toluene insoluble portion found C═F and C═H absorption as well as a trace of olefin absorption.

In regard to the elemental analysis in Tables VII and VIII, analytical limitations in respect to fluorine prevented the total analysis from adding up to 100%.

The above procedure was repeated with potassium fluoride substituted for the lithium fluoride and essentially the same type of results were obtained.

Example VII

This example illustrates the fluorination of cyclohexane by the method of the invention.

The procedure employed was generally that described in Example I. Five grams of cyclohexane was mixed with 50 grams of sodium fluoride and then cooled by powdered Dry Ice. The solid mixture was then fluorinated with 10 cc./min. fluorine diluted with 200 cc./min. of helium for 5 hours at −15° C. The liquid components (2.15 grams) contained unreacted cyclohexane plus 9 component mixture containing C═F and C═H absorptions in the infrared spectrum. Solid products were also contained (1.56 grams) which also contained C═H and C═F bonds based on infrared analysis.

Example VIII

This example illustrates the fluorination by the method of the invention of paraffin wax.

Paraffin wax of a melting point of about 52° C. in an amount of 25 grams was dissolved in 250 ccs. of carbon tetrachloride and stirred with 100 grams of sodium fluoride. The carbon tetrachloride was then removed and 25 grams of the resultant product was finely divided to a particle size less than 1 mm. diameter and mixed with an additional 20 grams of finely divided sodium fluoride (1 mm.). The resultant paraffin wax coated sodium fluoride particles were fluorinated at room temperature with fluorine (10 cc./min.) diluted with (100 cc./min.) of helium. The fluorination was continued until fluorine was noted at the gaseous exit end. Ether extraction of the fluorinated product gave a 35° C. melting point wax, which showed strong C═F absorption at 1260–1120 $cm.^{-1}$ in the infrared spectrum. Extraction of the solid product with water and concentrated hydrochloric acid left a white solid which did not melt at 300° C. This solid had a high fluorine content (over 56%) but still contained some carbon-hydrogen bonds.

Example IX

This example illustrates the formation of hexachlorohexafluorocyclohexane by the method of the invention.

The procedure was essentially that described in Example I. Fifteen grams of hexachlorobenzene were physically mixed with 50 grams of sodium fluoride of a 1 mm. sieve size and the mixture was charged to the stirred reactor. A gaseous mixture of fluorine (10 cc./min.) diluted with nitrogen (100 cc./min.) was passed into the stirred bed for a total of 11.7 hours at which time the mixture became too hard to stir. The fluorination was started at room temperature (24° C.) and averaged about 45° C. Upon completion of the fluorination of the solids (69.4 grams) were extracted with anhydrous diethyl ether. The ether extract solids were recrystallized from ethyl alcohol-water mixture. The product was a white solid having a melting point of 96–97° C. and was identified as hexachlorohexafluorocyclohexane.

*Analysis.*—Calculated for $C_6Cl_6F_6$=18.07 wt. percent C, 9 wt. percent H, 53.35 wt. percent Cl, 28.58 wt. percent F; found for the product was 17.9 wt. percent C; 0.1 wt. percent H; 52.3 wt. percent Cl; and 24.3 wt. percent F. The calculated molecular weight is 399 and the found molecular weight is 448.

Example X

The foregoing procedure was repeated except the hexachlorobenzene was dissolved in 200 cc. of benzene and 50 grams of the sodium fluoride were added to form a paste and the paste was placed under vacuum to remove benzene and the resultant residue solid was ground to a particle size fine enough to pass a 1 mm. sieve. Fluorination was conducted for a period of 8.7 hours. The portion of the product soluble in anhydrous diethyl ether was analyzed and determined to be hexachlorohexafluorocyclohexane. Analysis of the product was as follows:

TABLE IX

| Tests | Calc. $C_6Cl_6F_6$ | Found |
|---|---|---|
| Wt. percent carbon | 18.07 | 18 |
| Wt. percent hydrogen | 0 | 0 |
| Wt. percent chlorine | 53.35 | 52.9 |
| Wt. percent fluorine | 28.58 | 20.7 |
| Molecular weight | 399 | 430 |
| Melting point, ° C | 94–96 | 95–96 |

Example XI

This example illustrates the unexpected effectiveness of having the organic material to be fluorinated in combination with the alkali metal fluoride catalyst as a coating in respect to the amount of fluorine which will chemically combine with a given amount of organic material under a given set for conditions.

Finely divided (1 mm. particle size) high density polyethylene of a molecular weight of about 110,000 and a melt index of 0.9 (15 g.) was physically mixed with 50 grams of finely divided (less than 1 mm.) sodium fluoride and the resultant mixture was charged to a stirred reactor. Fluorine (10 cc/min.) diluted with $N_2$ (100 cc./min.) was passed through the stirred mixture and the reaction temperature averaged about 30° C. At the end of 5.3 hours of fluorination a positive $F_2$ test (starch=KI paper) was obtained in the gases exiting from the reactor.

In comparison high density polyethylene (15.0 grams) was dissolved in 380 cc. of boiling toluene. Finely divided (less than 1 mm. particle diameter) sodium fluoride was added to the resultant toluene solution. The suspension was cooled to room temperature with stirring. The resultant polyethylene coated sodium fluoride solids were recovered, washed with anhydrous ether and dried under vacuum. The recovered solids were then ground to an individual particle size of less than 1 mm. average diameter and washed with ether and dried. The resultant finely divided polyethylene coated sodium fluoride particles (56.5 g.) were charged to a stirred fluorination reactor. Fluorine (10 cc./min.) diluted with nitrogen was passed through the reactor and a positive $F_2$ test (starch KI paper) in the gases exiting from the reactor was not obtained until the 30.5 hour of fluorination.

The above comparative runs demonstrate that in the method of the invention for a given set of conditions substantially more fluorine can be introduced in a given amount of organic material when it coats the fluoride catalyst surface than when the organic material is in finely divided admixture with finely divided alkali metal fluoride catalyst.

We claim:

1. A method of fluorinating an organic compound selected from the group consisting of alkane, cycloalkane, aromatic hydrocarbon of 6 to 20 carbons, dibasic acid of 3 to 20 carbons, polybenzene hydrocarbon of a molecular weight of between 500 and 50,000, and aromatic hydrocarbons of 6 to 20 carbons having a substituent radical thereon selected from the group consisting of nitro, nonfluoro halogen, carboxyl and dicarboxyl anhydride, comprising contacting said compound with fluorine in the presence of alkali metal fluoride catalyst.

2. A method of fluorinating an organic compound selected from the group consisting of alkane, cycloalkane, aromatic hydrocarbon of 6 to 20 carbons, dibasic acid of 3 to 20 carbons, polybenzene hydrocarbons of a molecular weight between 500 and 50,000 and an aromatic hydrocarbon of 6 to 20 carbons having a substituent radical thereon selected from the group consisting of nitro, nonfluoro halogen, carboxyl and dicarboxyl anhydride, comprising contacting said compound with a gaseous mixture of fluorine and inert gas diluent at a temperature between about −100 and 200° C. in the presence of an alkali metal catalyst in a mole ratio of catalyst to compound of at least about 0.1:1.

3. A method in accordance with claim 2 wherein said catalyst is lithium fluoride.

4. A method in accordance with claim 2 wherein said catalyst is potassium fluoride.

5. A method in accordance with claim 2 wherein said catalyst is sodium fluoride.

6. A method of fluorinating an organic compound selected from the group consisting of alkane, cycloalkane, aromatic hydrocarbon of from 6 to 20 carbons, dibasic acid of 1 to 20 carbons, polybenzene of a molecular weight between 500 and 50,000, aromatic hydrocarbon of from 6 to 20 carbons having a substituent radical selected from the group consisting of nitro, non-fluoro halogen, carboxyl and dicarboxyl anhydride. comprising contacting said compound with a gaseous mixture of fluorine, an inert gaseous diluent wherein the volume ratio of gaseous diluent to fluorine is between about 0.5:1 and 100:1 at a temperature between about −100 and 200° C. in the presence of alkali metal fluoride in a mole ratio of fluoride to compound of at least about 0.1:1.

7. A method in accordance with claim 6 wherein said compound is said aromatic hydrocarbon and said temperature is between about −20 and 100° C.

8. A method in accordance with claim 7 wherein said hydrocarbon is benzene.

9. A method in accordance with claim 7 wherein said hydrocarbon is toluene.

10. A method in accordance with claim 7 wherein said hydrocarbon is naphthalene.

11. A method in accordance with claim 6 wherein said compound is alkane and said temperature is between about 10 and 200° C.

12. A method in accordance with claim 11 wherein said alkane is polyethylene of an average molecular weight between about 10,000 and 200,000.

13. A method in accordance with claim 11 wherein said alkane is paraffin wax.

14. A method in accordance with claim 6 wherein said compound is the substituted aromatic hydrocarbon and said temperature is between about −20 and 50° C.

15. A method in accordance with claim 14 wherein said substituted hydrocarbon is benzoic acid.

16. A method in accordance with claim 14 wherein said substituted hydrocarbon is hexachlorobenzene.

17. A method in accordance with claim 14 wherein said substituted hydrocarbon is nitrobenzene.

18. A method of fluorinating an organic compound selected from the group consisting of alkane, cycloalkane, aromatic hydrocarbon of 6 to 20 carbons, dibasic acid of 1 to 20 carbons, polybenzene of a molecular weight between about 500 and 50,000, and aromatic hydrocarbon of from 6 to 20 carbons having a substituent radical thereon selected from the group consisting of nitro, nonfluoro halogen, carboxyl and dicarboxyl anhydride, comprising contacting finely divided particles, said particles comprising said organic compounds coating an alkali metal fluoride catalyst surface with fluorine at a temperature between about −100 and 200° C. in a mole ratio of said catalyst to said compound of at least about 0.1:1.

19. A method in accordance with claim 18 wherein said catalyst is sodium fluoride.

20. A method in accordance with claim 14 wherein substituted aromatic hydrocarbon is phthalic anhydride.

21. A method in accordance with claim 1 wherein said organic compound is malonic acid.

References Cited

J. Amer. Chem. Soc. 72, 2411, 1950.

LORRAINE A. WEINBERGER, Primary Examiner

PAUL J. KILLOS, Assistant Examiner

U.S. Cl. X.R.

260—468, 537, 644, 648, 653.1, 653.8, 653.9